Patented Aug. 7, 1923.

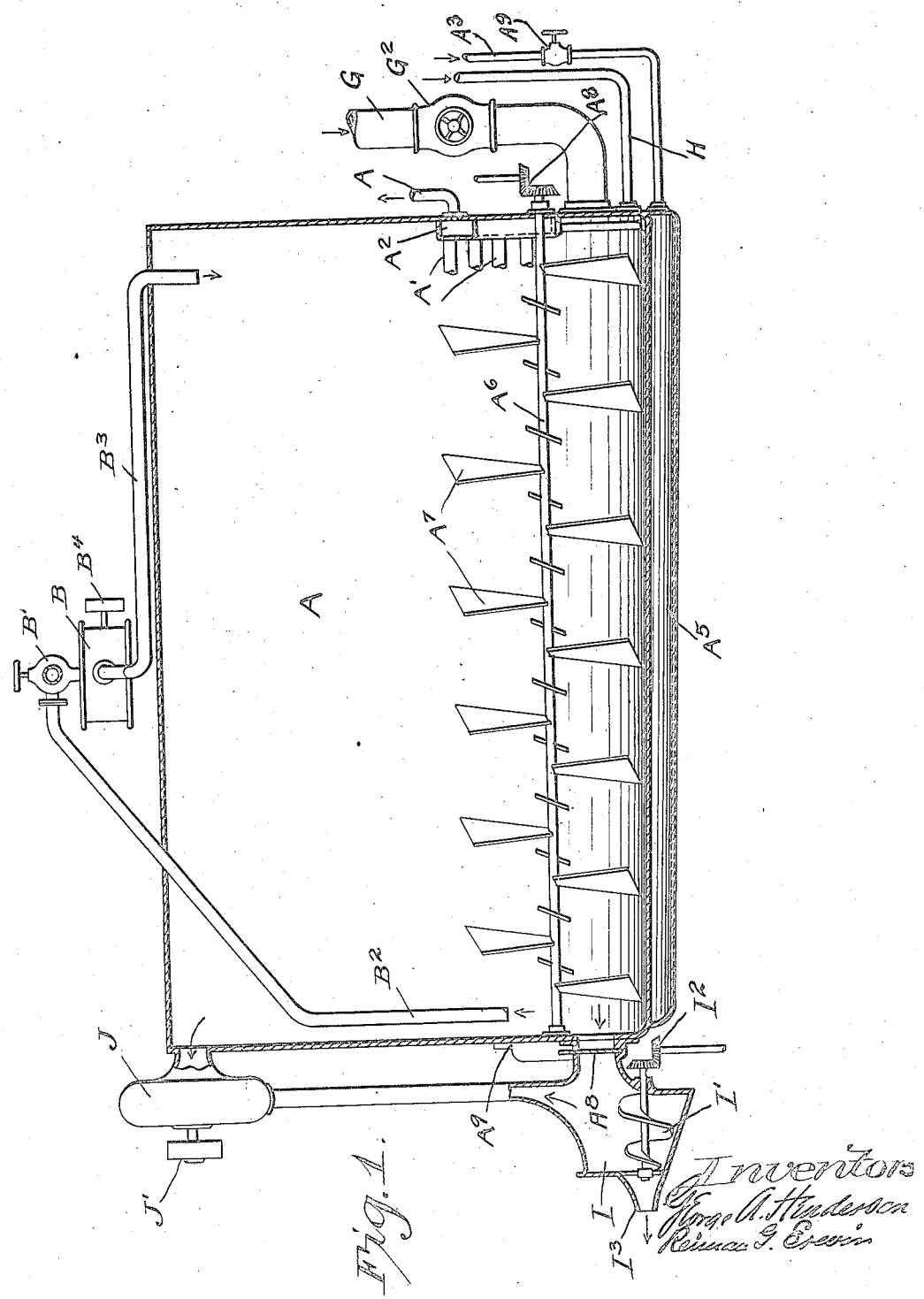

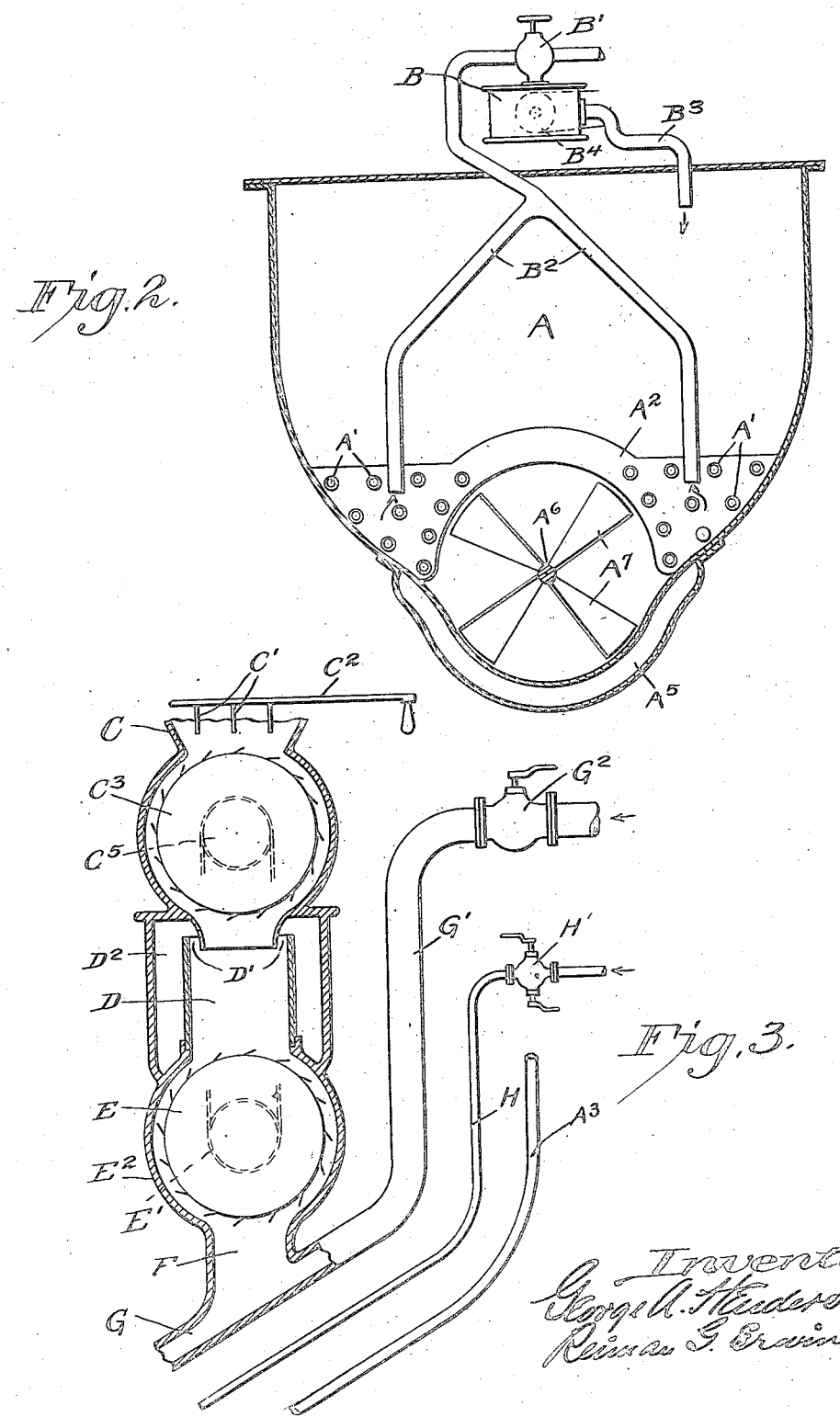

1,464,480

UNITED STATES PATENT OFFICE.

GEORGE A. HENDERSON, OF CHARLESTON, AND REIMAN G. ERWIN, OF ST. ALBANS, WEST VIRGINIA.

PITCH CEMENT AND PROCESS FOR MAKING THE SAME.

Application filed June 16, 1920. Serial No. 389,482.

*To all whom it may concern:*

Be it known that we, GEORGE A. HENDERSON and REIMAN G. ERWIN, citizens of the United States, residing at Charleston and St. Albans, in Kanawha County, West Virginia, respectively, have invented new and useful Improvements in Pitch Cements and Processes for Making the Same, of which the following is a specification.

The invention relates to cements of vulcanizable material in combination with chemicals and dust, and its prime object is to colloidally suspend substantial proportions of the latter in normally semi-solid and solid binding mediums forming the continuous phase for use as a filler and binder between brick and other paving aggregates, precoated or not with other pitch cements.

It is known that the life and inherent stability of a bituminous paving structure is increased in proportion to the extent impalpable mineral dust content thereof is increased consistent with such dust's practical agglomeration in a binder, such as pitch cement. It is also known that the binding value of pitch cements is directly proportional to the amount of true binding base (bitumen) which it holds, consistent with the minimum of other constituents (such as oil) essential to its ductility for given purposes.

Without regard to the absorbent, colloidal or other characteristics of mineral particles of impalpability substantially finer than those that pass a 200 mesh sieve in their relation to the consistency of a binding medium colloidally suspending them, it has been heretofore proposed to mix adventitious soil, dirt and other mineral aggregates containing a relatively small amount of clay with pitch reduced to a workable liquefaction with water, volatile and other oils, forming thereof an emulsion; and we are aware of attempts to suspend molecular dust in an oil residuum of sufficient normal fluidity below the temperature of boiling water to form an emulsion with such dust when mixed therewith in the form of an aqueous paste, there being only sufficient pitch designed to remain in the final product, in non-excessive quantity, to constitute the continuous phase between such dust mixed with larger aggregate in substitution of the water evaporated therefrom at temperature below the boiling point of water, the relatively small proportion of such dust so introducible being predetermined as a part of a graded aggregate in which 80–100 mesh particles and larger sand grains are relied upon as an aid to the separation of the said smaller particles during the formative period of a product of such graded aggregate; but to our knowledge in no such instance so known to the prior art has the quantity of truly colloidal dust as hereinafter specified, been the subject of any proposal for its colloidal suspension within a normally semi-solid or solid binding medium in excess of ten per cent of the aggregate mixture of which such dust forms a part; but on the contrary it is known to all versed in the art that, notwithstanding its beneficial functions, dust of such nature, has not, in the prior art, been introducible practicably, or colloidally, in excess of said ten per cent, and that, due to failures of the means heretofore proposed for increasing its quantity, all standard United States paving specifications relating to bituminous structures have limited the quantity of such molecular dust permissible therein to less than said ten per cent of the total structure.

According to our invention we increase inherent stability, cohesiveness, adhesiveness, melting point and compressive strength, and we decrease the susceptibility to temperature changes and the cost of, pitch cements to the extent we increase the surface energy of the dust of our product over that possible in the prior art, by means of the additions in the specific manner herein claimed.

In this specification we mean by the word "dust" that adsorbent mineral matter premixed with the chemicals, etc., hereinafter specified, exceeding 70% of which dust is silica reduced by subdivision to such a degree of impalpability that all of it shall readily pass a 200 mesh sieve, exceeding 60% of which shall be smaller than .02 millimeter, in gradations down to and including those particles smaller than 2 microns and of colloidal nature; by "pitch" we mean asphalic or other oil residuums, coal tar and other like substances of normal consistency equivalent to from 40 to 60 penetration as determined by the distance a standard No. 2 needle will penetrate the normal pitch at 77 deg. Fahr. when weighted with 50 grams for five seconds; by "filler" we means dust colloidally suspended in the pitch as distinguished from larger aggregates of paving structures; by "moisture" we means a quantity of water in excess of that required to maintain the identity of our other ingredients as such, as distinguished from hydrocarbons, whether that moisture be in the form of a fog, steam or other vapor hereinafter mentioned; by "dry" we mean a dry state in the common acceptation of the work; by "normal" we mean to refer to the natural state of the ingredient at 77 deg. Fahr. when without combination with our other ingredients herein specified.

As we have discovered that normal pitch of consistency within the limits of the above penetrations represents the maximum cementing capacity obtainable in any bituminous cement for practical purposes, we have in practice specifically limited its use accordingly with a view to standardization of our product's production.

Our invention will be best understood by reference to the accompanying drawings illustrative of one embodiment of our process, it being premised, however, that various changes in the apparatus may be adaptable to carrying it out within the spirit and scope of the invention as defined in the appended claims.

Fig. 1 is a side elevation in section of a reaction vat with connections; Fig. 2 a cross sectional view thereof and Fig. 3 a cross sectional view of a dust bin and means of introducing dust therefrom to the pitch in the vat A, a closure in which normal pitch is charged by first heating it in an auxiliary tank not shown, and sucking the same therefrom through three-way cock B′ of pump B through pipe B³ to the vat A, pump B being operated by driven member B⁴ connected with motive power not shown. It is proposed to maintain the pitch in a thoroughly melted condition at temperature above the boiling point of water, in vat A by means of steam injected through pipe A³, injector A⁹ to a steam jacket A⁵ about the underside of semi-cylindrical base of vat A shown in Fig. 1 and Fig. 2, and from said steam jacket A⁵ through pipe A¹⁰ through manifold A² to pipes A′, from which pipes said steam is then exhausted to the atmosphere through exhaust pipe A¹¹, for the purpose of heating the pitch in vat A, during continuous agitation of the contents of vat A, by its longitudinal movement by blades A⁷ rigidly anchored to shaft A⁶ revolved by driven member A⁸ connected with the machine's motive power, which blades are designed to form the action of a perfect screw for said purpose. Further mechanical agitation of the mass in vat A is provided by means of suction thereof up through pipe B² shown in Fig. 1, through pump B and down again to the top of the vat contents through pipe B³, continuously as hereinafter described.

Referring now to Fig. 3, C is a dust bin in which the dust with powdered chemicals is deposited in a dry state in predetermined proportion to that of the pitch preliminarily charged to vat A. In practice we prefer a plant composed of a plurality or a battery of independent units such as hereinafter described, each with capacity of approximately twenty tons of pitch cement per eight hours operation, and supplied with the separate ingredients, power and heat from common sources, not shown. In preparing the dust from clay (in example) we thoroughly dry the clay to its residual or latent moisture content of approximately three per cent, (called water of hydration), and then pulverize it in a pug mill, from which it is continuously conveyed in a gradual flow to a drum, equipped with revolving spoon shaped agitators designed to lift and drop the same while moving the larger particles toward a discharge end. In this drum we provide a current of air the volume and velocity of which is predetermined in relation to the specific gravity and volume of the dust therein then manipulated, to fix the degree of fineness of the dust therein carried in such air suspension through the exhauster creating said current and fixing said air velocity as its vehicle to a dust collector where it is entrapped, the air itself escaping then to the atmosphere. That dust too large to be carried in the predetermined velocity of air suspension, passes out of the drum to be elevated to the mill and there reground with the additional new material therein added in a continuous operation. From the dust collector the dust of nature hereinabove specified, is precipitated through a gate valve by gravity to measuring devices wherein it is, in predetermined quantities mixed with powdered sulphur, sodium chloride, sulphate of copper and sodium sulphate in the proportions in the manner for use in our process as hereinafter specified, and the dust mixture then elevated to dust bin C, aforesaid, in which bin we provide a set of prongs C′ manually operated by lever C² to break down any of the dust that may, by reason of the affinity of its molecules for each other, compact or arch within the bin C during operation of feeder C³, a steel ball snugly fitting and revolved within steel casing C⁴, by motive power connected with driven member C⁵, as shown, by which operation the dust from the bin is precipitated in air suspension through chamber D equivalent to exceeding 1,000 times the volume of the dust therein present and precipitated by gravity therethrough, which air is of temperature approximately 40 deg. Fahr. supplied to chamber D through vents D' at its top, from chamber D² surrounding chamber D, and packed with ice or other cooling medium. In this connection we have discovered that when colloidal dust is so suspended each particle is separately attacked by the air which forms a film thereof about each particle in size fixed by the relative temperatures of the dust and air and the time to which the dust is thereto exposed, which accomplishment aids in maintaining colloidal suspension in the greater volume of air and in preventing coalescing of the particles by reason of their normal affinity for each other. Upon falling through chamber D by gravity these particles are lodged on the ball of feeder E, and precipitated through its casing E² by moving member E' reciprocally connected with the driven member of ball C⁵ aforesaid, and connected with motive power not shown. The space between ball E and its casing is such that the air films about the particles therethrough passing are not disturbed but the dust falls from the ball E by gravity in air suspension to chamber F, and thence into steam pipe or tube G, supplied with steam from a supply thereof not shown through injector G' under sufficient pressure to be forced through the tube G into vat A at temperature of the steam of sufficiently high degree to avoid congealing of the molten pitch in vat A, therein agitated under sustained heat as aforesaid. In this connection we have discovered that the air films about the particles of dust are instantly removable therefrom by the application of even slight heat, and that the vaporized moisture in tube G at once attacks and displaces the air film, substituting about each particle a film of moisture, in the nature of a veritable fog, substantially thicker than the film of air so replaced; and this condition is attributable to the entry of the dust coated with air in suspension of the enormous volume of air in its relation to the volume of the dust there in such suspension as aforesaid. Indeed we have discovered in our practice that under such conditions the separating capacity of the vapor has been found sufficient to overcome the normal affinity of two or more of such colloidal dust particles for each other when joined together and to force them apart, in such suspension, and provide a vaporous film surrounding each of them. In practice we have fixed the proportion of steam to the air in tube G with regard to the degree and duration of ebullition of the pitch in vat A caused by the entry of moisture in such form thereto, and therein subjected to the heat above the boiling point of water present in the pitch, which ebullition and vehicular transpersion of the dust therethrough, in such deflocculated suspension, in a continuous flow, results in the accomplishment of our prime object, viz:

While in a state of fluidity due only to the sustained heat in vat A and the mechanical agitation therein above described, the injection of the dust laden steam at the bottom of vat A results in the lodgment of the dust particles wherever, in the agitated pitch the heat thereof above the boiling point of water vaporizes that moisture to the extent of the dust particles' release therefrom, which vapor then acts in the mass as hereinafter described and is ultimately sucked out of the vat through the exhauster J in operation during the entire period of our process, by the connection of its movable member J′ with power not shown, to provide a partial vacuum in vat A which we have discovered not only aids in securing extreme ebullition of the pitch therein (as compared with such ebullition at atmospheric pressure) but in reduction of the boiling point of water, and accordingly the rapid vaporization of any remaining moisture in the vat.

As colloidal chemistry is that of bubbles, particles, films and filaments and that of disperse colloids a state of matter as distinguished from an amorphous form as commonly understood, colloidal dust sufficiently divided, is, in the specific manner herein described, maintained in constant though in varying degrees of colloidal suspension, depending on its relation to the volume, specific gravity and consistency, respectively, of its suspending medium in the formative period of our product, and in our product thereby lodged in a permanently fixed state due to the ultimately solid consistency of our suspending medium as distinguished from its consistency during the formative period, and as contradistinguished from any condition relating to a product in which the so-called Brownian movement of colloidal dust may be exemplified.

As drops of water will coalesce when brought into contact with each other, so will molecules of pitch in far greater degree, due to the greater affinity of pitch molecules for each other. Accordingly we have in our experiments, discovered that in the absence of such separating mediums as herein employed throughout our process, colloidal dust, even when in air suspension in the absence of our separating means, invariably coalesce as does water, though to a lesser degree due to their affinity for each other, which affinity is due to the enormously increased surface energy of the particles viz, that of the dust we use, in presenting approximately 58 square feet of area to the pound of 2.8 sp. gr. dust, as compared with approximately 36 sq. ft. of such surface area in the case of 80–100 mesh grains heretofore permissible for this, among other reasons, in the above cited prior art.

Accordingly, in carrying out our process we first separate and suspend the dust as it is discharged from the bin, and subsequently provide for its further separation, and for sustained maintenance of that colloidal condition by interfering, as by the means herein specified, with its coalescing affinity until separately lodged in the molten pitch, and by the means now to be described perpetuate that colloidal separation therein, viz:

If that part of our process, viz, injecting dust laden steam to the reaction vat, be conducted with due regard to time and temperature fixed to cause complete vaporization of the suspending moisture when so lodged in suspension of an excessive quantity of agitated pitch reduced to temporary liquefaction by the specific means herein described, the dust particles will travel separate paths along the approximate line of said mechanical projection of the mass in the vat, and, before passing up through the pitch, will have given off their separate films of moisture in the form of steam caused by the temperature of the pitch specifically maintained above the boiling point of water, and will simultaneously become lodged within while adsorbing an infinitesimal film of the pitch entrapping medium, which adsorbed film is, in thickness, axiomatically proportionate to the size of the molecular particle and its adsorbing capacity in its relation to the temporary degree of fluidity of the pitch. The resultant steam, which, as per common knowledge, is approximately 1600 times the volume of the moisture from which is was evolved, thus freed of its individual dust particle burden, then acts in the mass to increase said temporary ebullition in further disseminating the pitch suspended molecules throughout the mass in vat A, to the extent the aggregate volume of the entire mass therein is thus increased, all in furtherance of the object of our invention.

In colloidal chemistry it is believed electrical forces are present which are directly responsible for the dispersion in a limited measure, of colloidal particles. To this assumed electrical force we add further electrical force in the form of deflocculating soluble salts, viz, sodium chloride sulphate of copper and sodium sulphate in the proportions hereinafter specified. Without knowing or attempting to claim any specific chemical reaction on the pitch, but observing the result of our addition of soluble salts thereto in the manner herein described. we rely on their colloidal dispersion throughout our process in the formative period of our product to aid in sustaining said colloidal condition therein so created according to the nature of the charge positive and negative about the particles and with the soluble salts; and, further, in our product, to effect its ultimate consistency as tested for penetration, depending as we have discovered it does, on the additions as and in the manner herein set forth with the results following, viz:

As in nature's production of pitch cement at Trinidad from asphaltic base petroleum, oxidation or dehydrogenization undoubtedly plays an important part. In this connection we have observed, in practice, that under the action of heat sulphur has the same condensing effect on pitch as has oxygen which has been heretofore injected thereto in the known process of "blowing" asphaltic residuums, viz: the sulphur eliminates hydrogen in the form of hydrogen sulphide gas. Accordingly we, in our process, rely on the widely dispersed and colloidally suspended powdered sulphur particles in vat A, to act, during dehydration of the mass therein, to form such gas, then acting on the mass physically to produce a bubbling, seething condition, during which approximately 50% of the free sulphur so injected is discharged as such gas, mixed with steam, air and other exhausted vapors, and after complete dehydration, approximately 50% thereof reacts chemically to combine with the pitch in the manner and for our purposes, viz:

It is known that sulphur reacts with two similar hydrocarbon molecules to form a single hydrocarbon together with hydrogen sulphide gas, and that when such reactions occur between ring compounds (as in this process) a nucleus condensation results, thus explaining in a measure the formation of polycyclic polymethylenes, or saturated cyclic hydro-carbons. In the case of coal tar pitch we have discovered that at this stage of our process, if chlorine gas be added the soluble salts act in such manner chemically that the isoprene of pitch changes to an isomer of the characteristics of rubber when in sufficiently thin films the pitch is exposed thereto and to vaporized sulphur and chlorine gas during the operation in an anhydrous mass, so that by the process herein described we produce sulfo-chlorinated pitch having increased ductility over, and a lower melting point in relation to that product known to the trade as pitch fluxed with oil, the life and consistency of which is unaffectable by climatic changes or such influences of air and water which in time volatilize the lighter oily constituents of pitch cements heretofore produced, resulting in early disintegration of the products of which they form a part.

At this stage of our process, therefore, it is our object to create the above mentioned thin films, by producing a cellular honeycombed condition of the mass in vat A for the initial purpose of presenting to the dust laden steam an enormously increased surface of agitated pitch to the end that the dust particles, on becoming lodged therein, may be widely separated from each other and completely dispersed or lodged until, their moisture films being displaced by the pitch, their permanent separation from each other in the final product is assured.

Upon completely emptying bin C of dust, the prescribed proportion thereof is found to have been injected to the pitch, in the percentages of each hereinafter specified. At this stage of the process tube G's valve G² is closed, and the contents of vat A then subjected to continued heat to completely dehydrate its contents, and when in an anhydrous condition the same is found to be honeycombed, cellular, and resembles Swiss cheese when it is in motion, due to the combination of the sulphur therewith.

Under the influence of the aforesaid partial vacuum, sustained heat, and mechanical agitation, increased chemical reaction of the mass is then had by the introduction of chlorine gas by the manual opening of cock H' in pipe H connected with a supply thereof not shown and by injector therefor provided, forced through pipe H to and within vat A. We have shown in our experiments that approximately three per cent of chlorine is combinable with the pitch when the gas is presented thereto when the pitch is in such cellular condition in changing forms thereof and presented to the action of the gas in relatively thin films of enormous aggregate surface in a sulphureted condition, the free chlorine being sucked from the vat through the exhauster and together with the hydrogen fumes entrapped in a condenser, not shown.

As an accelerator in said chemical combination we have injected with the dust a small quantity of litharge oxide of lead and as a further protective colloid we have in experiments used from 1/200% to 1/2% of gelatine, with some satisfactory though in practice we do not consider these essential to the accomplishment of our purposes as herein described, and in practice we have also eliminated the hereinabove specified sulphate of copper, though in some instances we have found this desirable, though not essential.

As a modification of our invention, however, we have injected such dust, soluble salts, sulphur and chlorine in steam suspension to asphaltic base petroleum, and under like conditions as herein provided, subjected the mass to sufficient heat to drive off the volatile oils producing of the residuum sulfo-chlorinated pitch colloidally suspending the herein claimed proportions of colloidal dust. We have likewise substituted for the above described dust of approximately 2.8 specific gravity, keiselguhr 100% silica all passing a 200 mesh sieve in like proportions to the pitch by volume, but of specific gravity less than that of the pitch, and because of such relationships by weight, have noted the permanent colloidal suspension of such dust in such light, high penetration bitumen or pitches, of oily lubricating nature (as distinguished from our binder) of a liquid nature below the melting point of water, heretofore used in the prior art to permeate as distinguished from binding and suspending, such dust, all of which liquid emulsions are, as will be understood from the foregoing, without the perview of our invention or claims.

In practice we have observed that of the excessive quantity of chlorine injected to the mass, more is combined in the case of coal tar pitch, namely, from 2 to 5% than in the case of asphaltic residuums, namely from 1 to 3%, and that in both cases it is impracticable to use more than 10% of sulphur in its free state with the dust, as not in excess of 7% thereof has been by us combined with the pitch, the excess being used merely for the purpose of forming hydrogen sulphide gas in the formative period of our product, for the purposes hereinabove described.

The proportions of the ingredients of our pitch cement will necessarily depend upon the various uses to which it may be put. Representing, as we have demonstrated, the maximum of practicability for all pitch cement purposes we have adapted and in practice use the following percentages of the hereinabove described ingredients, by weight.

In relation to the pitch content the following percentages: of sulphur 4 to 8%, sulphate of copper 1/4 to 1%, sodium chloride and sodium sulphate derivatives 1 to 3% chlorine 1 to 4%, mixed with dust in sufficient quantity to cause the latter with said additions to represent from 35% to 75% of the total product colloidally suspended in from 25% to 65% of pitch of the characteristics hereinabove specified.

In example we have obtained excellent results of our process in a product containing:

Mineral matter, dust, water of hydration, and derivatives of the above chemicals_____ 45%
Bitumen (before vulcanization) soluble in carbon disulphide (pitch)_____ 55%   100%

To empty the vat A the material may be compacted through smaller gate A⁸ into discharge chamber I wherein it is further compacted in partial vacuo by revolving screw conveyer I' and revolved by member I² connected with the machine's motive power, of construction shown in Fig. 1, for the purpose of reducing its cellular condition, eliminating its gaseous content, and then forced through die I³ wherein it is compacted while hot to aid in its vulcanization, while forming the same in shape. However, in other cases, the larger gate A⁹ is opened and the material, when still warm, and in its cellular condition, is removed by the continued operation of agitating blades A⁷ when the mass in such condition may be at once cooled by water or otherwise, to the end that its cells may be reserved to receive subsequent heat more readily than would be the case in a compacted product, when reheated for subsequent use as a cement, as desired.

We claim:

1. The process of producing a chemical composition constituting an improved pitch cement, consisting in drying clay, then pulverizing it in a drum and drawing through the agitated mass a current of air, the velocity of which is predetermined and fixed in relation to the specific gravity of the clay-dust to remove from the mass in air suspension only those particles all of which will pass a 200 mesh sieve 60% being smaller than .02 millimeters in gradations down to smaller than 2 microns, discarding the larger particles and exhausting the air to the atmosphere, then mixing the colloidal particles with powdered sulfur, copper sulfate, sodium chloride and sodium sulfate; then cooling the mixture in air suspension to a temperature of approximately 40 deg. Fahr. to separate the particles from each other and to prevent their coalescing while introducing them to heat above 212 deg. Fahr., in the form of steam, to displace the air-films and to further separate the particles from each other while substituting for the air, thicker films of heated moisture about each of the particles, and to create a fog consisting of the colloidal dust, powdered chemicals and films of heated moisture surrounding each of them; then introducing the mixture in steam suspension in a pipe and injecting the mass into a vat containing an excess of molten pitch; then, under the influence of sustained heat, suction and agitation, providing a partial vacuum in the vat, reducing the pitch to a state of extreme fluidity and cellular condition by the steam, and by the elimination of moisture from steam by the heating sulfur forming hydrogen sulfid gas, and the introduction of electrolytes in the form of soluble salts and protective colloids, while continuously injecting onto said cellular film and separately lodging thereon in a state of disperse colloid, additional chemicals and dust-laden steam during dehydration of the mass and suction of the residual steam, gases and vapors from the vat, then injecting chlorine gas into the mass and subjecting the mixture to further heat to combine the ingredients, and to colloidally suspend the dust in, while vulcanizing the pitch, substantially as described.

2. An improved cement consisting of pitch which has been vulcanized with from one to five per cent chlorine and hydrogen sulfide and sulphur dioxide gases, with more than thirty five per cent by weight of colloidally suspended mineral dust in sizes all of which have passed a two hundred mesh sieve, mixed with from .25% to 1% sulfate of copper, 1% to 3% sodium chloride and 1% to 3% sodium sulfate.

3. An improved cement consisting of pitch which has been vulcanized with from one to five per cent of chlorine and hydrogen sulphide and sulphur dioxide gases and mixed with a small quantity of sodium sulfate, sodium chloride and copper sulfate.

4. An improved pitch cement consisting of pitch which has been vulcanized with from one to five per cent of chlorine and hydrogen sulfide and sulfur dioxide gases in the presence of an accelerator of vulcanization and protective colloids.

In witness whereof we have hereunto set our hands in the presence of two witnesses this fourteenth day of June, 1920.

GEORGE A. HENDERSON.
REIMAN G. ERWIN.

In the presence of—
H. F. HANKS,
F. L. ALFORD.